United States Patent [19]
Grosewald et al.

[11] 3,879,278
[45] Apr. 22, 1975

[54] COMPOSITE CERMET THIN FILMS

[75] Inventors: Peter S. Grosewald, Youngstown; Dennis G. Shirback, Lockport, both of N.Y.

[73] Assignee: Airco, Inc., New York, N.Y.

[22] Filed: Dec. 21, 1971

[21] Appl. No.: 210,623

Related U.S. Application Data

[60] Division of Ser. No. 56,128, July 6, 1970, abandoned, which is a continuation of Ser. No. 694,729, Dec. 29, 1967, abandoned.

[52] U.S. Cl. .................................. 204/192; 117/201
[51] Int. Cl. .............................................. C23c 15/00
[58] Field of Search ..... 204/192; 117/169 R, 123 B, 117/201

[56] References Cited

UNITED STATES PATENTS

| | | | |
|---|---|---|---|
| 3,329,526 | 7/1967 | Daily et al. | 117/123 B |
| 3,563,873 | 2/1971 | Beyer | 204/192 |
| 3,594,295 | 7/1971 | Meckel et al. | 204/192 |
| 3,617,373 | 11/1971 | Mott | 204/192 X |
| 3,673,071 | 6/1972 | Pritchard, Jr. et al. | 204/192 |
| 3,673,117 | 6/1972 | Schroeder et al. | 117/201 X |

*Primary Examiner*—John H. Mack
*Assistant Examiner*—D. R. Valentine
*Attorney, Agent, or Firm*—L. R. Cassett; H. H. Mathews; E. W. Bopp

[57] ABSTRACT

A thin electroconductive glaze film comprising an amphorous uniform interdispersion of a glass phase and a conductive phase, said phases having been co-deposited as said film by sputtering thereof from a solidified slurry of a frit of said glass and a particulate dispersion of said conductor.

5 Claims, 1 Drawing Figure

PATENTED APR 22 1975
3,879,278
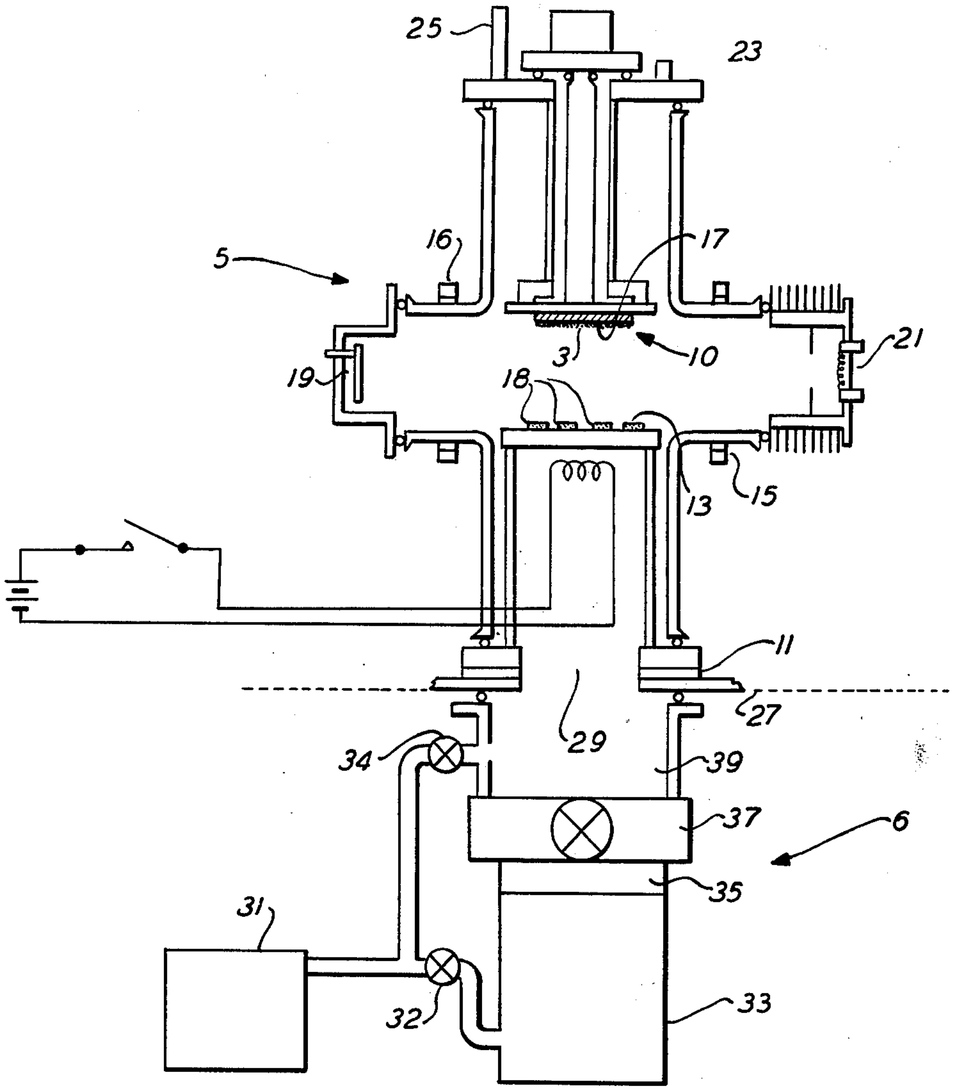
INVENTORS
PETER S. GROSEWALD
DENNIS G. SHIRBACK
BY Stefan J. Klauber
ATTORNEY

COMPOSITE CERMET THIN FILMS

This application is a Division of Application Ser. No. 56,128 filed on July 6, 1970 now abandoned, which in turn was a continuation of application Ser. No. 694,729 filed Dec. 29, 1967, now abandoned. su

BACKGROUND

This invention relates generally to the technology of electroconductive glazes, and more specifically to methodology whereby formation of thin films of these materials is enabled.

The advent of integrated circuitry in which thin film components are deposited on wafers with isolated active devices placed in or on the wafer surface, has led to an increasingly intense demand for smaller and smaller discrete components. This problem of miniaturization has been particularly troublesome in the case of passive elements — such as resistors — in that neither materials nor methods for application of such materials have been available which could produce in the limited surface areas available, sheet resistances compatible with other components of the circuitry.

Earlier technology directed at manufacture of thin film resistive elements took the approach of vacuum depositing films of materials like Nichrome or mixtures of chromium and silicon monoxide. Reference may be had in this connection, for example, to U.S. Pat. No. 3,203,830 disclosing preparation of a chromium-silicon monoxide film resistor by evaporating the two constituents from separate containers in a vacuum and depositing the resulting vapor mixture on a suitable substrate. The thinnest films producible by these methods, however, which still exhibit good reproducibility, electrical stability, and other important resistor characteristics such as low temperature coefficients of resistance, do not display sheet resistances higher than about 5,000 ohms/square.

More recently, there has been disclosed new classes of cermet-like, conductor-dispersed-in-glass materials, often referred to as electroconductive glazes. A resistive glaze of this type is, for example, disclosed in U.S. Pat. No. 3,238,151 K. H. Kim, the particular teaching therein being directed toward a fired resistive glaze generally comprising a microfine dispersion of thallium oxide in a glass matrix. When one considers the fact that these glaze materials are initially in a coatable form and furthermore display a capability for wide compositional variation, it might be supposed that they would prove useful as thin film elements. Unfortunately, however, the methodology taught in Kim and in similar disclosures (as for example U.S. Pat. No. 3,304,199) has not been found thus applicable. The failure of these glazes to find use as thin films has been due to the fact that the methods of this prior art have involved deposition of the glaze pastes on substrates by screen printing or by direct painting, followed by firing of the coated material. In those instances where the thickness and width of the paste is decreased to approach dimensions suitable for thin film utility, the resistance and other characteristics become unacceptable in terms of practical devices or components. Further reduction in pattern dimensions yields, as a matter of fact, discontinuous films, such limitation arising from the particulate nature of the conductive phase. Reduction of particle size would seem to be one solution, but in the "thick" films — meaning approximately 10 microns and up — that result from this prior art glaze film production, the limits of mechanical particle size reduction has been virtually reached.

In accordance with the foregoing, it may be regarded as an object of the present invention to provide a new class of passive thin film materials useful in microcircuit applications.

It is another object of the invention to provide a method whereby electroconductive glaze films may be fabricated which display uniformity and thinness exceeding that previously known in the art.

It is a further object of the invention to provide a class of passive thin films of such controllable composition as to enable resistances to as high as 10 megohms per square.

Yet another object of the invention is to provide a method whereby a thin, amorphous or microcrystalline composite glaze film can be selectively deposited on a substrate, whereby a pattern suitable for thin film microcircuitry can be generated.

SUMMARY OF INVENTION

Now in accordance with the present invention, the objects previously recited, together with others as will become apparent in the course of the ensuing specification, are achieved by a process wherein initially a slurry of a glass frit, a conductive component, and possible fillers and temporary binders, is solidified and adhered to a suitable substrate — as for example by firing or baking the slurry upon the substrate, or by otherwise treating the composition so as to remove the volatile components. The resulting solidified layer — which in the case of firing would correspond to the thick film glazes taught in the prior art — is thereafter utilized as the target portion of a sputtering system containing at a suitable position therein a second substrate upon which the sputtered material can deposit as a uniform thin film. Because the material constituting the thin film has, by the process indicated, been passed through the vapor phase, a virtually interatomical dispersion of glass and conductor result in the thin film itself. Because, furthermore, the material being sputtered is essentially uniform to begin with, the sputtering mechanism will result in a thin film which is uniform in the extreme and which displays compositional proportions identical to that of the thick film being sputtered.

BRIEF DESCRIPTION OF DRAWING:

A fuller understanding of the present invention may now be achieved by a reading of the ensuing specification. The single FIGURE appended hereto may be found helpful in this connection. This drawing graphically depicts apparatus of the type utilized in the invention. While the apparatus shown is itself conventional, it is thought that depicting the several substrates utilized in typical practice of the invention in their actual position for sputtering, will prove helpful to the reader in gaining a complete understanding of the techniques described.

DETAILED DESCRIPTION OF PREFERRED EMBODIMENT:

The single FIGURE appended hereto generally illustrates sputtering apparatus of the type which may be utilized in practice of the present invention. As has been indicated in the preceding paragraph, there is, in general, little unconventional about the device shown: the depicted apparatus (above gasket 11) is in fact a simplified schematic of a sputtering module 5 available from R. D. Mathis Company, Long Beach, Calif., under designation 216A. The apparatus includes the usual elements familiar to those skilled in the art of vacuum technology, such as receiving surface 13, source (target) surface 17, primary anode 19, cathode assembly 21, focusing magnets 15 and 16, gauge connector 23, and controlled leak 25. The module 5 is affixed to a base plate 27 in which a port 29 communicates with a vacuum system 6. The latter, again is conventional, and may include a mechanical pump 31, diffusion pump 33, baffle 35, gate valve 37, manifold 39, and control valves 32 and 34. Module 5 may optionally include an auxiliary heating or cooling system 10, so positioned as to enable control of temperature at the vicinity of receiving surface 13.

Electrical connections, power supplies, etc. utilized in connection with operation of the depicted apparatus, are — in the interest of simplicity — not explicitly shown. In the usual mode of operating the apparatus in the process of the present invention however, it may be indicated that source 17 will be maintained at a typical potential of about −1kV, and that the receiving surface 13 will be maintained at about −100V, or will be left floating.

In accordance with the present invention, there is positioned on target surface 17 of module 5 a substrate 10 bearing a layer 3 of the material to be sputtered. In the usual practice of the invention the substrate 10 will comprise a supporting conductive disc, and will typically be formed of stainless steel or the like.

Layer 3, affixed to substrate 10, is a solidified mass of electroconductive glaze paste, and is the material which in practice of the invention will be sputtered to substrate (or substrates) 18 located on receiving surface 13. The pastes utilized do not per se form part of the present invention, although their application to the present environment is unique, and as will be subsequently pointed out, leads to unique results. Typically, these pastes will comprise dispersions of metals, conductive oxides, semi-conductors, etc. in essential mixture with glass frit, miscellaneous added inert materials and/or temporary binders usually being present in addition to provide required consistency and electrical properties. The phrase "electroconductive" as applied to these glaze pastes is a broad one, and the materials of this type useful in this invention will include both pastes which are precursors of nominally conductive glazes and pastes which are precursors of resistive glazes. Essentially resistive compositions of this type are disclosed, for example, in U.S. Pat. Nos. 3,238,151, 3,052,573, 2,837,487, 3,154,503, and 3,329,526. Higher conductivity paste compositions are also widely known. A large number of such higher conductivity pastes are, for example, commercially available from the Dupont Company of Wilmington, Dela., under such product number designations as 7553 (platinum-gold-glass), 6998 (platinum-silver-glass), and 6730 (silver-glass).

Pastes of the type referred to in the prior paragraph are applied to substrate 8 by any of numerous techniques wellknown in the art. The paste material may, for example, simply be painted or otherwise spread upon the substrate. Following application of the slurry-like paste, the mass is solidified. In this connection it may be noted that all of the electroconductive glaze pastes referred to are characterized by the fact that firing thereof yields a thoroughly uniform electroconductive glazed product, which externally resembles glass or a ceramic. While firing is preferably used to solidify the initially deposited paste into layer 6, and while firing does add mechanical strength and "life" to the target, it has been found in practice of the present invention that the paste slurry can be solidified by mere removal of the excess solvents and volatiles at temperatures below those which "fire" the paste — that is below temperatures which melt the glass frit binders — and that the resulting solidified paste layer will still be effective in the ensuing sputtering process. This point will be illustrated in more detail in the Examples which occur later in this specification.

The layer 6 present on substrate 8 is in most instances (where firing is used) the same type of electroconductive glaze film which has been described in the literature as an end product in and of itself. In a typical instance, this film was thus in the past utilized as a resistor. Having been applied by screen printing and the like, however, its thickness is at least 10 microns or so — and hence is nowhere in the thin film range. In accordance with the present invention, this thick film of selected material is now sputtered to substrates 18 on receiving surface 13 to form thereon completely uniform thin films in the angstrom range.

Sputtering of the thick film represented in layer 6 may be achieved by operating the device in the FIGURE in an r.f. or reactive sputtering mode. Details and further references to these techniques may be found in Leon I. Maissel's paper, "*The Deposition of Thin Films by Cathode Sputtering*" appearing in Vol. 3 of "*Physics of Thin Films*", Academic Press, New York (1966). However, it has surprisingly been found that very good results obtain as well when the present materials are sputtered by direct DC techniques, and this may be regarded as the preferred mode of practice for the invention. It is not precisely understood why DC sputtering should be so effective in the present invention, although it is opined that the great uniformity and fine interdispersion of conductor and insulator present in the thick film being sputtered — particularly when the latter is in a completely fired condition — may provide the explanation for why the ceramic-like layer 6 can be so processed. This explanation would suggest that sufficient uniform conductivity is present in layer 6 to prevent the build-up of space charge in the vicinity of its surface — as usually occurs with dielectrics subjected to the DC fields present with this type of sputtering.

The thin films resulting from practice of the invention are unique in many respects. One important aspect of these films arises by virtue of the fact that the sputtering mechanism used in their formation enables one to begin with a complex glass-conductor composition, and transfer that complex composition to a thin film form without causing any substantial breakdown in the chemical components of the composition. Such a chemical breakdown will, on the other hand, typically result where other types of evaporative processes are attempted. In the present invention, sputtering is believed to be thus efficacious in that relatively large chunks of the complex composition are transferred from thick to thin film at a time, the typical "piece" of sputtered material including perhaps 20 or 30 atoms of the composition.

Typical examples of the present invention and the results achieved thereby, are as follows:

EXAMPLE I

A slurry made up of 40% lead borosilicate glass frit, 40% powdered silver, 20% powdered palladium, and ethyl cellulose and butyl carbitol and emulsifiers, was spread onto a 5½ inches diameter stainless steel supporting disc as an approximately 5 mil thick film. The coated disc was then heated to 110°C for 5 minutes to drive off the volatiles, fired to higher temperatures (650°C) to melt the glass and give greater mechanical strength, and then placed as a target in sputtering apparatus resembling that of the FIGURE. The composition cited was DC sputtered onto an alumina substrate for a period of 10 minutes to yield a 0.8 micron film compositionally identical to the target material. In this particular run the measured filament current was 7.4 amps, anode current 1.5 amps, the target was maintained at 2 kV with a current of 50 ma, the field current was 0.65 amps, ambient pressure was 1 micron argon, and the average target substrate distance was 3.75 inches. The resulting thin film displayed a sheet resistance of 33 ohms/square, TCR of +53 ppm/C° over the range 0° to 150°C, no drift was evident in the resistance values over the range 0–150–0° over a measured 33 minute period.

It should be observed in Example I that the thin film resulting from sputtering of the fired thick film glaze possesses the same chemical composition as the latter, which is indeed one of the principal advantages of the present technique. What is meant by this is that the sputtered thin film displays on a percentage basis an identical proportion of components as is found in the thick target film. This result is an important one and is a consequence of sputtering. Using a target material which is macroscopically (and in those instances where the thick film is fired, even microscopically), a highly uniform material yields thin films which are uniform in composition and thickness. Such result is a special case of the reported finding that where blended materials — such as for example alloys — are sputtered, they enter the vapor phase (at equilibrium) at a rate directly proportional to their concentration in the top layers of the blended material. The equilibrium time is governed by the sputtering of the constituents, but is of the order of seconds. This aspect of sputtering phenomena is discussed further at page 98 of the Maissel paper previously alluded to.

While the component proportions of both thick and thin films are thus identical, the compositional identity achieved in the present thin films, is very much more uniform from point to point therein than is the case with the thick target film in that deposition is from an essentially constant component vapor mixture. The actual interdispersion of conductive and glass phases in the thin films of the present invention is in fact so fine as to lend the film an amorphous or microcrystalline structure. X-ray examination thus reveals in the thin films little or no crystal structure.

Similarly, in this connection, it may be noted that the physical change in the structure of the films is so vast that the conductive properties present in the new thin films are believed to occur by virtue of an entirely different mechanism than is present in the case of the thick fired target film. Whereas in the latter case conduction is thus thought to be dependent on a fine filamentary structure present in the cermet, it is believed that in the present thin films no such filaments are present, and that instead charge is transferred therein by quantum mechanical tunneling between the islands of conductors present in the 3-dimensional insulator matrix.

EXAMPLE II

A slurry was formed with the essential consistency 30% $RuO_2$ and 70% lead borosilicate glass frit. The slurry was spread on a 5 inches stainless steel disc and dried at 110°C and thereafter fired at 770°C for 10 minutes in order to drive off the volatiles. The coated disc was mounted in the sputtering module of the FIGURE and thin films were deposited on finish alumina substrates positioned on recurring surface 13. The operative time was 30 minutes utilizing filament current of 7.4 amps, anode current 1.5 amps, and target potential of 2 kV. The pressure was 2 microns argon, and field current 0.3 amp was observed. The target substrate was positioned on the average 3.75 inches from the receiving substrates. The resulting 10 micron film had a sheet resistance of 450 ohms/square following annealing for a period of 13 minutes at 750°C (0° to 750° to 0° in 13 minutes).

EXAMPLE III

Slurrys similar to Example II were prepared from an initial composition of 50% lead borosilicate glass and 50% $RuO_2$, together with suitable temporary binders, dried at 110°C for 30 minutes, fired at 700°C for 30 minutes. The target material was then sputtered onto glass substrates (under the same conditions as in Example II but at 1 micron argon for 5 to 15 minutes) to produce thin films ranging from 1,000 to 6,000 A. Sheet resistances from 400 ohms to 5 k ohms/square, depending on film thickness, annealling time and annealling temperatures were measured in these films. TCR's of the order of −300 ppm/C° or less were found.

EXAMPLE IV

A slurry of 20% $IRO_2$ and 80% Q12 (a borosilicate frit available from Harshaw Chemical Company) and suitable emulsifiers was dried and fired and used as a target. The deposited film, after annealing at 600°C for 30 minutes had a sheet resistance of 900 ohms/square and a TCR of −300 ppm/C° with no drift in resistance. A similar target sputtered in a 2% $O_2$, 98% Argon atmosphere yielded films of 340 ohms/square, TCR of −190 ppm/C°, following annealling. 5% $IRO_2$ and 95% Q12 inks led to films with resistances of 120 K ohms/square, TCR ca. −400 ppm/C°, no drift following a 750°C anneal for 30 minutes. Thinner films of the same composition had resistances of 0.6 M ohms/square, TCR −600 ppm/C°.

EXAMPLE V

Targets formed from 20% $O_5O_4$ and 80% Q12 (Harshaw) inks were sputter deposited on glass substrates to yield films with sheet resistances of about $10^4$M ohms/-square.

EXAMPLE VI

A slurry was formed by mixing:

80% $Tl_2O_3$ with

20% Ceraflux glass frit (Harshaw), and adding thereto as emulsifiers eithyl cellulose and butyl carbitol, mixing the emulsified composite and spreading the composite slurry on a copper disc, and firing the disc in order to drive off the volatiles.

The composite and its support were then mounted in a suitable holder to form the cathode or target in a vacuum deposition system. The material was transferred to substrates by DC sputtering for a period ranging from 1 to 15 minutes. The resulting composite films have resistance ranging from 1 K ohm/square to 1 M ohm/-square as a controllable function of film thickness, sputtering atmosphere and substrate temperature during deposition.

EXAMPLE VII

A slurry was formed by blending:

80% $Tl_2O_3$ and
20% Q12 glass frit with
ethyl cellulose and
butyl carbitol emulsifiers.

Proceeding thereafter as in Example VI, films range from 1/4 K ohm/square, and up to 10 M ohms/square, were produced as a controlled function of thickness, substrate temperature, atmosphere, and postdeposition annealling temperature and atmosphere.

EXAMPLE VIII

In this instance the initial paste slurry comprised approximately

56% WC,
14% W,
30% No. 7052 Corning glass frit,
ethyl cellulose, and
butyl carbitol, the last two being added in sufficient quantity to disperse and emulsify the previous constituents. The films are formed as described previously. The deposited films displayed sheet resistances of about $10^2$M ohms/-square, depending on thickness, and, after a 30-minute, 650°C anneal in argon, this value decreased to about 750 K ohms/square.

EXAMPLE IX

Here the initial slurry contained approximately

70% $In_2O_3$,
30% Q12 lead borosilicate glass frit, plus emulsifying agents as in Example VIII.

The sputter deposited films had a resistance of 60 K ohms/square and a temperature coefficient of resistance of −600 ppm/C°. By varying the deposition conditions the resistance could be varied upwards as high as 3.5 M ohms/square.

In the Examples VI through IX above, resistance and temperature coefficient of resistance values were found to be modifiable by changing the percentage and/or type of glass in the composite mixture, and by changing the oxygen content (0–10 percent) of the sputtering gas, normally argon.

While the present invention has been described in terms of specific embodiments thereof, it will be understood in view of the instant disclosure, that numerous variations thereon and modifications thereof may now be readily devised by those skilled in the art without yet departing from the present teaching. Accordingly, the present invention should be broadly construed and limited only by the scope and spirit of the claims now appended hereto:

We claim:

1. An electrically resistive article including a substrate bearing thereon a thin electroconductive glaze film, said film comprising an amorphous uniform interdispersion of an insulating glaze phase and a conductive phase, said phases having been codeposited as said film by sputtering thereof from a fired glaze thick film comprising a conductive particulate component uniformly dispersed in a glass matrix, said thin film being below 10 microns and being further characterized by exhibiting conduction via quantum mechanical tunneling between adjacent conductive phase portions thereof.

2. An electrically resistive article including a substrate with a thin film thereon having a thickness of substantially 10 microns or less wherein said film comprises an amorphous uniform interdispersion of a glass phase and a conductive phase, said phases having been codeposited as said film by sputtering thereof from a fired glaze thick film comprising a conductive particulate component uniformly dispersed in a glass matrix.

3. A film according to claim 2, wherein said conductive phase comprises a noble metal oxide.

4. A film according to claim 3, wherein said conductive phase comprises ruthenium oxide.

5. A film according to claim 2, wherein said conductive phase comprises thallium oxide.

* * * * *